United States Patent
Hay et al.

(10) Patent No.: US 11,343,143 B2
(45) Date of Patent: May 24, 2022

(54) USING A FLOW DATABASE TO AUTOMATICALLY CONFIGURE NETWORK TRAFFIC VISIBILITY SYSTEMS

(71) Applicant: Arbor Networks, Inc., Burlington, MA (US)

(72) Inventors: Ronald G. Hay, Ann Arbor, MI (US); James E. Winquist, Ypsilanti, MI (US); Andrew D. Mortensen, Ann Arbor, MI (US); William M. Northway, Jr., Ann Arbor, MI (US); Lawrence B. Huston, III, Ann Arbor, MI (US)

(73) Assignee: Arbor Networks, Inc., Westford, MA (US)

(*) Notice: Subject to any disclaimer, the term of this patent is extended or adjusted under 35 U.S.C. 154(b) by 246 days.

(21) Appl. No.: 15/389,006

(22) Filed: Dec. 22, 2016

(65) Prior Publication Data
US 2018/0183714 A1     Jun. 28, 2018

(51) Int. Cl.
*H04L 41/0816*     (2022.01)
*H04L 67/1097*     (2022.01)

(52) U.S. Cl.
CPC ...... *H04L 41/0816* (2013.01); *H04L 67/1097* (2013.01)

(58) Field of Classification Search
CPC .................................................. H04L 41/0816
See application file for complete search history.

(56) References Cited

U.S. PATENT DOCUMENTS

| | | | |
|---|---|---|---|
| 8,676,729 B1* | 3/2014 | Keralapura | H04L 63/1416 706/12 |
| 9,158,604 B1* | 10/2015 | Christodorescu | G06F 21/00 |
| 2011/0219035 A1* | 9/2011 | Korsunsky | G06F 21/00 707/784 |
| 2014/0380467 A1 | 12/2014 | Winquist et al. | |
| 2016/0352764 A1* | 12/2016 | Mermoud | H04L 63/1425 |
| 2016/0373588 A1* | 12/2016 | Raleigh | H04M 15/61 |
| 2017/0286690 A1* | 10/2017 | Chari | G06F 21/577 |
| 2018/0077175 A1* | 3/2018 | DiValentin | G06F 16/254 |

OTHER PUBLICATIONS

Related Co-pending U.S. Appl. No. 15/362,250 (conf. #7400) filed on Nov. 28, 2016.

* cited by examiner

*Primary Examiner* — Brian Whipple
(74) *Attorney, Agent, or Firm* — Locke Lord LLP; Scott D. Wofsy; Christopher J. Capelli

(57) ABSTRACT

A method for configuring a network monitoring device is provided. A plurality of flow records is received. The plurality of flow records is analyzed according to user-specified criteria to identify one or more network traffic patterns. A plurality of network entities associated with the one or more identified network traffic patterns is identified. A managed object including the identified plurality of network entities is generated.

6 Claims, 4 Drawing Sheets

USING A FLOW DATABASE TO AUTOMATICALLY CONFIGURE NETWORK TRAFFIC VISIBILITY SYSTEMS

FIELD OF THE INVENTION

Embodiments of the present invention relate generally to network switch devices and systems, and specifically to using a flow database to automatically configure network traffic visibility systems.

BACKGROUND OF THE INVENTION

Computer networks are formed by a collection of devices operating according to a set of various protocols. Typical computer networks are formed by routers that each executes routing protocols to discover routes between various endpoints, and switches that execute switching protocols, such as the spanning tree protocol (STP). In accordance with the routing protocols, routers exchange information regarding routes discovered by the routers. In this manner, each router typically performs its own determination as to the best routes to use to cause traffic to traverse the network.

As computer networks such as the Internet continue to grow in size and complexity, the challenge of effectively provisioning, managing and securing networks has become linked to a deep understanding of their traffic. Indeed, recent spates of cyber-attacks and the frequent emergence of applications affecting Internet traffic dynamics demonstrate the importance of identifying and profiling significant communication patterns within network traffic data. Nevertheless, because of the vast quantities of data and the wide diversity of traffic on large networks, developing a comprehensive understanding of the collected data remains a daunting and unfulfilled task. Most of the prior work in this area has focused on specific aspects of traffic or applied metrics that are deemed interesting a priori to identify significant network events of interest. For example, some systems may focus on techniques for identifying port scans or for analyzing worm and other exploit activities on the Internet. Further, signature-based intrusion detection systems look for well-known signatures or patterns in network traffic, while several anomaly detection systems have been developed using data mining techniques. Thus, visibility into physical and virtual network traffic enables stronger network security and superior network performance.

To improve visibility, network traffic is often grouped into categories (referred to hereinafter as managed objects) where a given traffic stream can belong to more than one of these categories. A network traffic visibility system typically can compute and display statistics about the network traffic in graphical charts, and view classification information by application, category, protocol, virtual server, country, type of device, and so on. In-depth information and application awareness provides network operators visibility into their network infrastructure so they can identify and monitor different types of traffic and resolve performance and security issues.

Traditional methods for creation and configuration of such managed objects rely heavily upon domain experts' knowledge about the network performance requirements, availability of various network components and the underlying infrastructure. Using this background knowledge, a network administrator is first required to configure the existing network infrastructure and then customize the configuration and deployment steps for a new managed object. In most cases, such an approach can be time consuming, error prone, and non-scalable to large scale networks. An automated approach to create and configure network traffic visibility system is desirable.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a method for automatically configuring a network traffic monitoring system is provided. The method includes receiving a plurality of flow records. The plurality of flow records is analyzed according to user-specified criteria to identify one or more network traffic patterns. A plurality of network entities associated with the one or more identified network traffic patterns is identified. A managed object including the identified plurality of network entities is generated.

In another aspect, a monitoring system includes a monitored network consisting of a plurality of devices. The monitoring system also includes a storage repository for storing network traffic flow information and one or more network monitoring devices communicatively coupled to the monitored network and to the storage repository. The monitoring device(s) are configured and operable to receive from the storage repository a plurality of flow records and analyze the plurality of flow records according to user-specified criteria to identify one or more network traffic patterns. The monitoring device(s) are further configured and operable to identify a plurality of network entities associated with the one or more identified network traffic patterns and to generate a managed object comprising the identified plurality of network entities.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
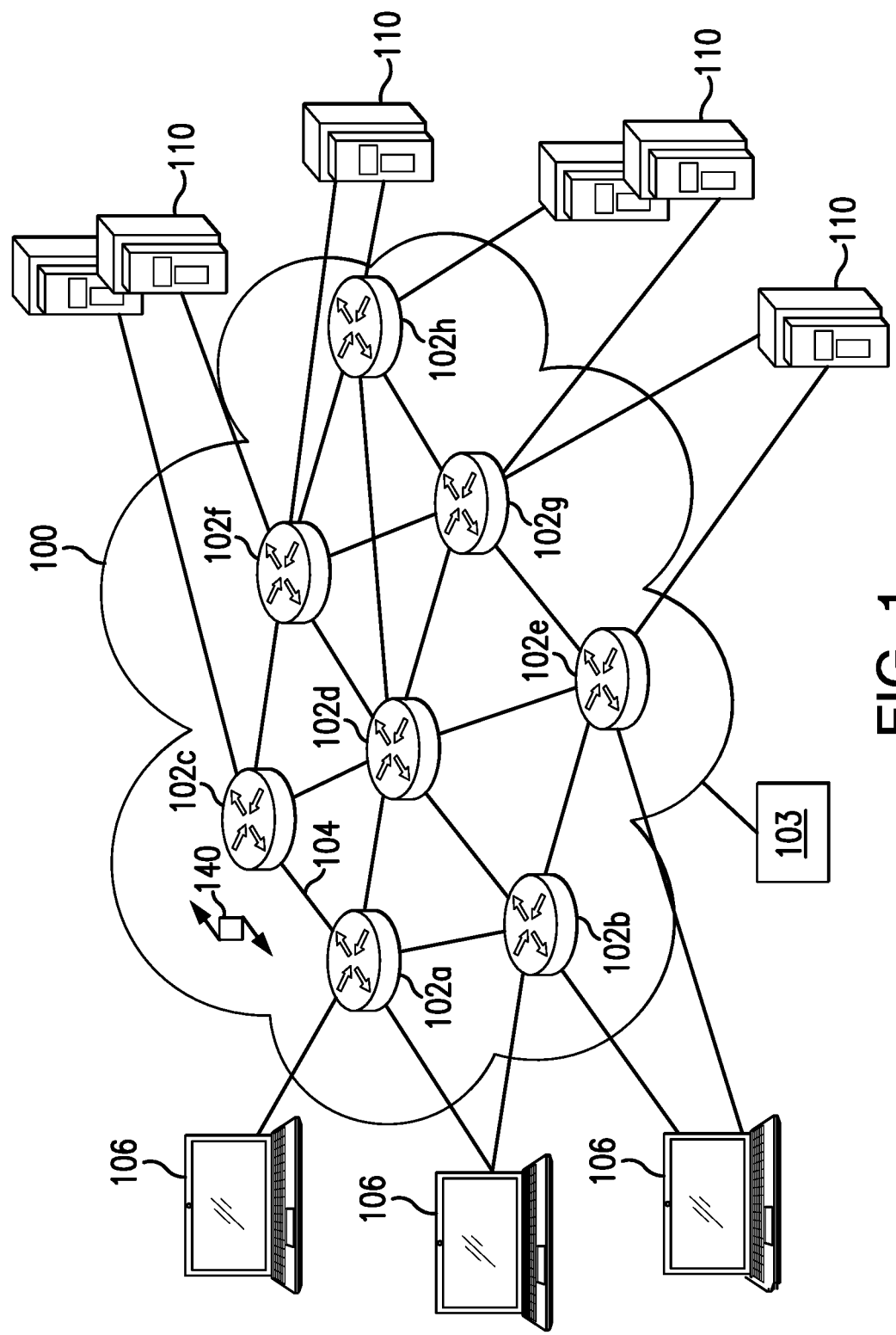
FIG. 1 illustrates a schematic block diagram of an example communication network illustratively comprising nodes/devices interconnected by various methods of communication.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

Upon capture, traffic flow patterns and anomalies can be analyzed to determine valuable network insights, including health of interfaces, devices and network services, as well as to provide timely alerts in the event of attacks. Various embodiments of the present invention are further able to identify important network security problems, such as DoS and DDoS attacks in real time. An appropriately-detailed network description allows attacking traffic to be rapidly identified and mitigated. Timely attack detection permits automatic or manual alerting of a mitigation system to such attack when the confidence level of attack detection is sufficient, as determined or pre-determined by the operator. According to embodiments of the present invention, DDoS detection can be performed by traffic flow analyzers which receive and analyze the incoming network traffic data stored in a flow database described below.

As networks continue to grow in speed and complexity, the owners of these networks have an increasing need to understand and control the traffic patterns and activity of the users of these networks. Consequently, configuration and maintenance of managed objects becomes increasingly challenging as well. Generating a plurality of managed objects, each associated with at least one type of network elements, allows the user to break the network into pieces using sophisticated methods of categorization. Various embodiments of the present invention contemplate a method that extends this categorization process by automating the managed object configuration which would otherwise be set through manual tuning, possibly with a lot of trial and error.

Various embodiments of the present invention can be used to facilitate the automation of managed object configuration for network traffic flow monitoring (traffic visibility) solutions by utilizing a large database of annotated network traffic flow data. The embodiments of the invention also demonstrate that there can be a reasonably low overhead for this automated approach.

In general, according to one aspect, embodiments of the present invention feature a method for automatically configuring a network traffic monitoring system. The method utilizes historical traffic flow data to derive certain information, as discussed below.

Turning now descriptively to the drawings, in which similar reference characters denote similar elements throughout the several views, FIG. 1 is a schematic block diagram of an example communication network 100 illustratively comprising nodes/devices 102a-h interconnected by various methods of communication or links 104. For instance, the links 104 may be wired links or may comprise a wireless communication medium, where certain nodes 102a-h, such as, e.g., routers, switches, sensors, computers, network devices, etc., may be in communication with other nodes 102a-h, e.g., based on distance, signal strength, current operational status, location, etc. Operatively, a client device 106 communicates data to/from servers or data centers 110 via network 100. In this fashion, client devices 106 can access data from particular servers/data centers 110.

According to embodiments of the present invention, one or more network monitoring devices 103 (described below in conjunction with FIGS. 3 and 4) are connected to network 100 via a data collector (tap), to read all packets flowing in the network 100. A tap is an apparatus that branches a network signal to extract the signal. For example, the data collector device may determine traffic flow information associated with one or more traffic flows over the local network (e.g., one or more connections between the base station and a network device, the network device and another network device, etc.). The network monitoring device 103 then analyzes the network state based on a predetermined rule, and if the network state satisfies a certain condition, notify a network manager of occurrence of failure or alerts the network manager of detected network attack. For instance, the network monitoring device 103 may determine a congestion-causing traffic flow based on the traffic flow information, and may provide information identifying the congestion-causing traffic flow to the network manager. Those skilled in the art will understand that any number of nodes, devices, links, monitoring devices etc. may be used in the computer network, and that the view shown herein is for simplicity. Also, while the embodiments are shown herein illustrate particular connections between nodes, the description herein is not so limited, and various types of networks can be used, as is understood by those skilled in the art.

Figure 2:
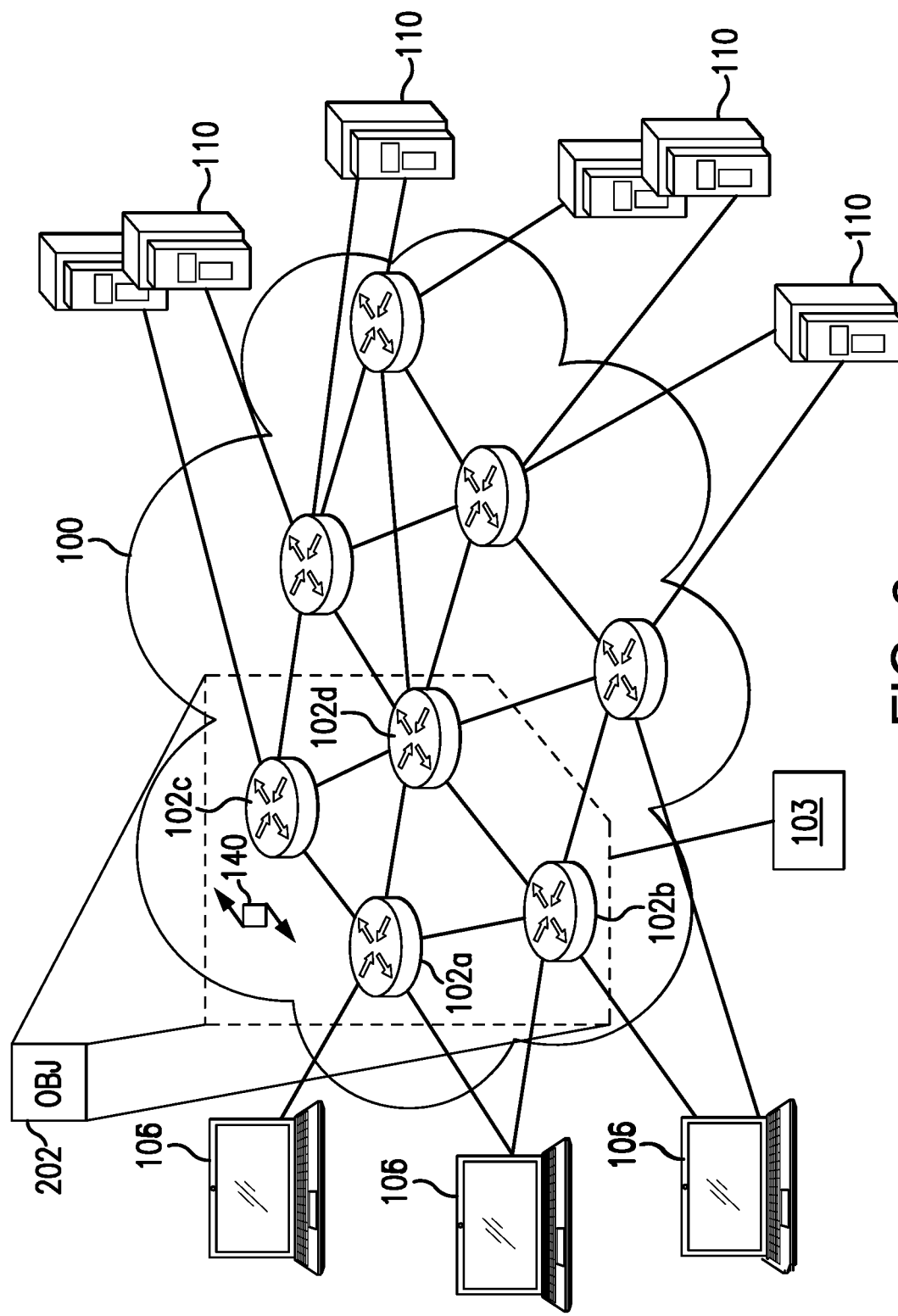
FIG. 2 illustrates various nodes in the communication network grouped into a single managed object.

FIG. 2 illustrates various nodes in the communication network 100 grouped into a single managed object 202. In particular, one or more nodes 102*a-d* are grouped according to a data capacity into the single managed group object 202. Such grouping is utilized by a flow data analyzer process 314 and an automated managed objects configuration process 316, as discussed herein. Notably, the nodes 102*a-d* of the single managed data object 202 can be grouped, for example, according to similar network interfaces. That is, each of the grouped nodes can include the same network interfaces such as data ports, processing capacity, etc. While FIG. 2 shows an illustrative embodiment, it is to be understood that various other adaptations and modifications may be made within the spirit and scope of the embodiments herein. For example, the embodiments have been shown and described herein with relation to particular nodes grouped in a managed object, however even a single node having multiple network interfaces can be grouped in its own managed object.

Figure 3:
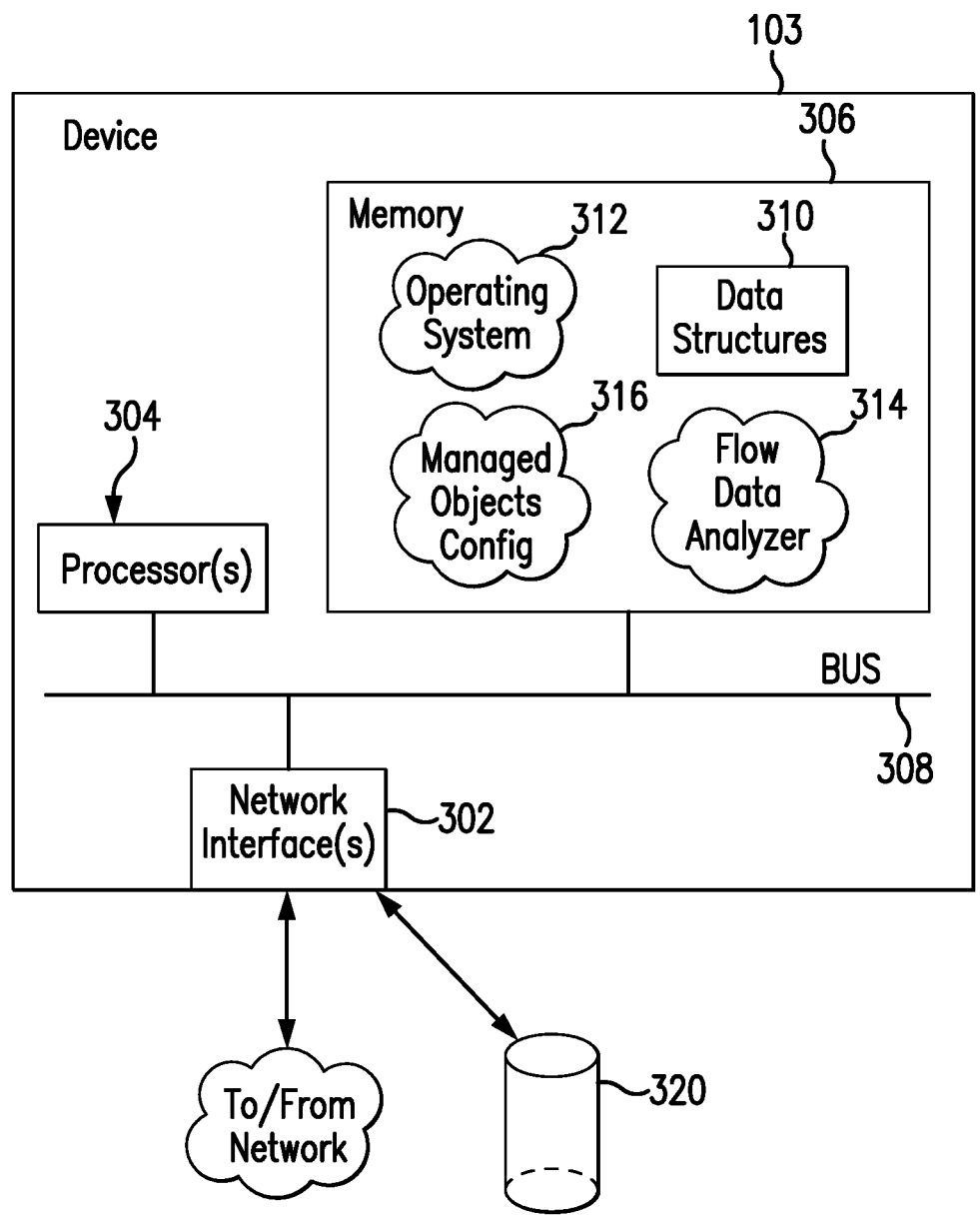
FIG. 3 illustrates a schematic block diagram of an example network monitoring node/device that may be used for configuring various managed objects in the communication network of FIG. 2.

FIG. 3 illustrates a schematic block diagram of an example network monitoring node/device 103 that may be used for configuring various managed objects in the communication network of FIG. 2. The monitoring device 103 may comprise one or more network interfaces 302, at least one processor 304, and a memory 306 interconnected by a system bus 308.

The network interface(s) 302 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 306 comprises a plurality of storage locations that are addressable by the processor 304 and the network interfaces 302 for storing software programs and data structures associated with the embodiments described herein. As noted above, certain devices may have limited memory or no memory (e.g., no memory for storage other than for programs/processes operating on the device). The processor 304 may comprise necessary elements or logic adapted to execute the software programs and manipulate data structures 310, such as routes or prefixes (notably on capable devices only). An operating system 312, portions of which are typically resident in memory 306 and executed by the processor, functionally organizes the device by, inter alia, invoking operations in support of software processes and/or services executing on the device. These software processes and/or services may comprise flow data analyzer 314 and managed object configuration process/services 316.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Illustratively, the techniques described herein may be performed by hardware, software, and/or firmware, such as in accordance with the managed object configuration 316, which may contain computer executable instructions executed by the processor 304 (or an independent processor of network interfaces 302) to perform functions relating to the techniques described herein.

An embodiment of the present invention takes in standard flow records exported from network devices 102 such as routers, switches, firewalls, hubs, etc., and annotates the flow with additional information. This information is derived from a number of sources, including Border Gateway Protocol (BGP), Simple Network Management Protocol (SNMP), user configuration, and other, intelligent flow analysis. These annotations add information to the flow data, and can be used to perform value-added flow analysis. The annotated flow is then stored in one or more internally maintained storage repositories (i.e., databases) 320. This allows the annotated flow to be processed and the enhanced information to be used by existing flow analysis infrastructure, such as flow data analyzer 314. The storage repository 320 may be a conventional, fault tolerant, relational, scalable, secure database such as Oracle or Sybase. Also, the repository 320 may be implemented as a mix of data structures, objects, and relational structures. Portions of repository 320, e.g., tables, may be exported and/or imported and thus decentralized and/or integrated.

As will be discussed further herein with respect to FIG. 4 and as noted above, in the present disclosure, an unsupervised clustering approach (e.g., using an unsupervised model), can be used on an existing network flow database 320 to identify different flow patterns within the storage repository 320. In some examples, an iterative clustering technique can be utilized to identify these flow patterns.

In one or more embodiments of the invention, the network monitoring node 103 is configured to store received data in the storage repository 320. Such network data captured over a time period (e.g., an hour, a day, a week, etc.) is referred to as flow summary or network flow summary. Network flow summary contains data units (e.g., IP addresses, flows, domain names, etc.) related to communications between nodes in the computer network 100. Further, the network flow summary may be associated with only time period in the past and is referred to as historical network data.

Alternatively, the network flow summary may be updated continuously from a starting time point and is referred to as real-time network data. For example, the real-time network data may have a fixed static starting time point or may encompass a fixed time interval with a dynamically changing starting time point. For example, the network flow summary may be captured on a routine basis using one or more data collectors and selectively sent to the network interface 302 from time to time to be formatted and stored in the repository 320 for analysis. The data collectors may comprise, for example, a packet analyzer, network analyzer, protocol analyzer, sniffer, netflow device, semantic traffic analyzer (STA), or other types of data collection device that intercept and log data traffic passing over the computer network 100 or a portion thereof. In one or more embodiments, the data collectors may be deployed in the computer network 100 by a network communication service provider (e.g., ISP), a network security service provider, or other business or government entities. The data collector may be configured to capture and provide network flow summary to the network monitoring node 103 through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network 100 or activated manually through the client device 106.

Figure 4:
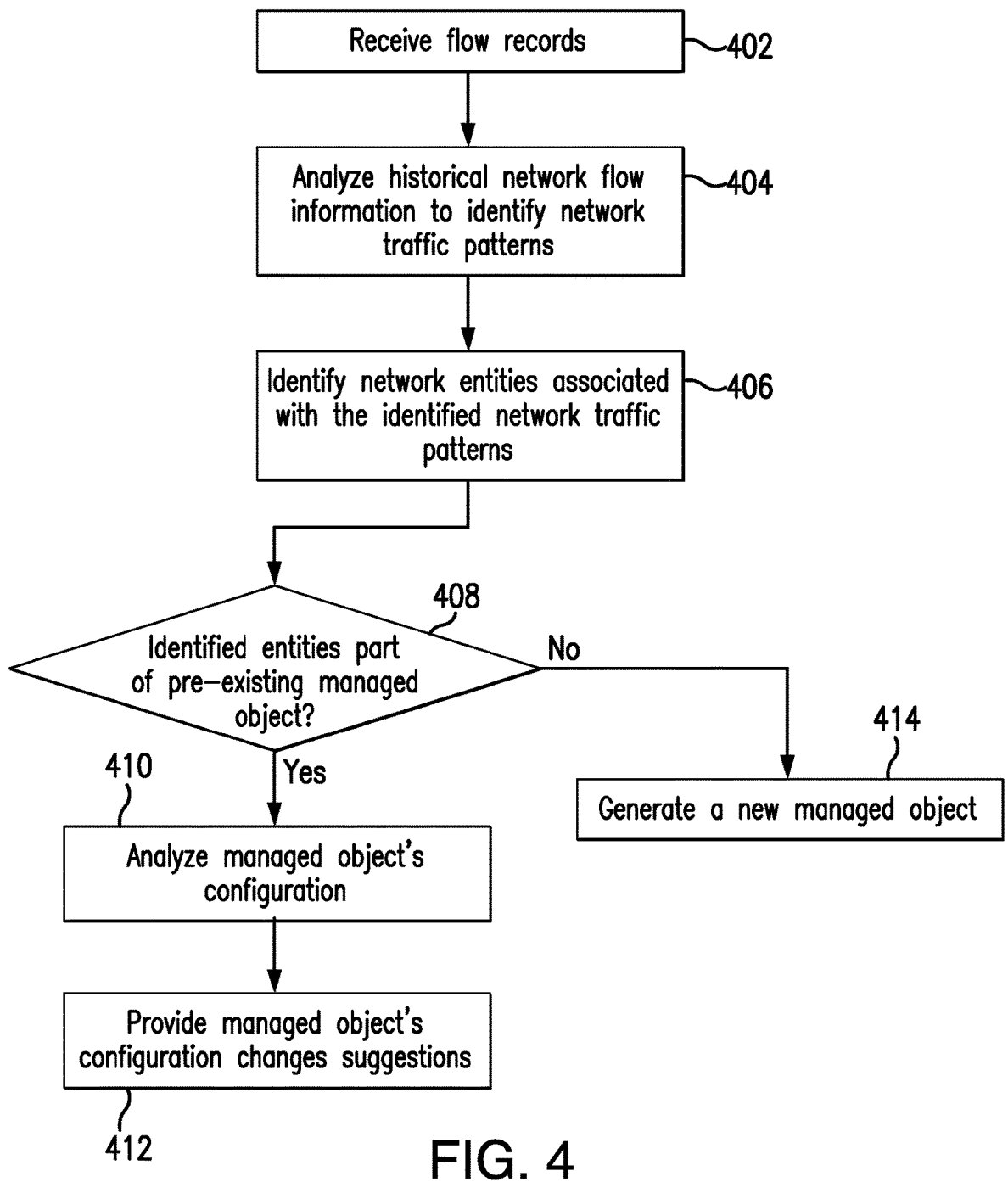
FIG. 4 is a flowchart showing the operation of the network monitoring device of FIG. 3, according to one or more embodiments discussed herein.

FIG. 4 is a flowchart showing the operation of the network monitoring device of FIG. 3, according to one or more embodiments discussed herein. Before turning to description of FIG. 4, it is noted that the flow diagram in FIG. 4 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

As noted above, network usage data typically includes numerous usage detail records, known as "flow records" containing one or more types of metadata (i.e., "data about data"). Known network flow records protocols include Netflow®, sFlow®, jFlow®, cFlow® and Netstream®. As used herein, a flow record is defined as a small unit of measure of unidirectional network usage by a stream of IP packets that share common source and destination parameters during a time interval.

The types of metadata included within each flow record vary based on the type of service and network involved and, in some cases, based on the particular network device providing the flow records. In general, a flow record provides detailed usage information about a particular event or communications connection between parties, such as the connection start time and stop time, source (or originator) of the data being transported, the destination or receiver of the data, and the amount of data transferred. A flow record summarizes usage information for very short periods of time (from milliseconds to seconds, occasionally minutes). Depending on the type of service and network involved, a flow record may also include information about the transfer protocol, the type of data transferred, the type of service (ToS) provided, etc.

In various embodiments of the present invention, the network flow records are collected and stored in the storage repository 320. The flow data analyzer 314 is configured and operable to analyze the stored flow records to produce meaningful result. In various embodiments, the flow data analyzer 314 may be capable of generating reports or summarized data files that support various business functions. In other words, the flow data analyzer 314 provides information about how network services are being used and by whom. In one example, the flow data analyzer 314 may analyze the stored flow records to forecast future network capacity, or to identify usage behavior indicative of network abuse, fraud, and/or attack.

In step 402, the flow data analyzer 314 preferably receives a subset of stored flow records matching specified user criteria from the storage repository 320. In some embodiments, the flow data analyzer 314 may receive streaming flow records from one or more flow record generating devices 102a-102h included within network 100. Exemplary flow record generating devices 102a-102h include routers, switches and gateways, and in some cases, may include application servers, systems, and network probes.

In step 404, the flow data analyzer 314 analyzes historical network flow information to identify network traffic patterns (e.g., similar increases and/or decreases in traffic volume) matching user-specified criteria. As noted above, this historical network flow information may be stored in the storage repository 320.

In one embodiment, step 404 may involve the flow data analyzer process 314 analyzing a plurality of historical network events that convey the state of one or more network managed objects (such as managed object 202 shown in FIG. 2). The data flow analyzer 314 accesses and uses the flow records to perform predetermined network usage statistical analysis. In general, the flow data analyzer 314 implements various statistical models that are defined to solve one or more network usage related problems, such as network congestion and network attack among others. The flow data analyzer process 314 uses the flow records and the statistical models to generate a statistical result, which also may be subsequently stored within the storage repository 320. By analyzing flow data, the data flow analyzer 314 can build a picture of traffic flow and traffic volume in a network.

In one embodiment, the data flow analyzer 314 may be responsive to a user interface for interactive analysis of the flow records. The user interface may comprise substantially any input/output device known in the art, such as a keyboard, a mouse, a touch pad, a display screen, etc. In one example, a graphical display of the statistical results may be output to a display screen at the user interface.

Such historical network events may include exceptional conditions associated with a potential attack occurring in the operation of the network 100. In one embodiment, events that convey a particular pattern or the state of managed objects can include performance metrics indicative of significant events selected from the group consisting of hardware/software failures, performance bottlenecks, configuration problems, and/or security violations associated with a monitored managed object.

Referring back to FIG. 4, in step 406, the data flow analyzer process 314 identifies network entities associated with the network traffic patterns identified in step 404. If in step 404 the data flow analyzer process 314 for each one of the plurality of flow records estimates a path that network traffic that belongs to that flow at least likely flows through then in step 406 the data flow analyzer 314 identifies one or more network entities along the estimated path. In one implementation, the originating and/or receiving devices can be derived based upon relationships derived between the entities. The relationship can be derived based upon any of communications between the entities, traffic patterns (e.g., similar increases and/or decreases in traffic volume) associated with the entities, similar communications originating from the entities independently, sporadic communication patterns, or use of commonly spoofed address (e.g., IP, MAC, URL, domain, etc.), among many others. For example, a first entity that has an indeterminate classification might be identified as communicating consistently with a second entity that has a reputation for originating botnet traffic (e.g., a network of malware infected computers that surreptitiously originate, e.g., spam traffic). Thus, while the reputation of the first entity might be indeterminate, a portion of the reputation of the second entity can be applied to the first entity based upon a relationship identified between the first and second entities. Alternatively, if a first entity with an indeterminate reputation consistently communicates with a second entity having a reputation for originating/receiving reputable traffic the reputation of the first entity can be biased towards classification as a reputable entity.

In some implementations, the identification of entities associated with a specific network traffic pattern can be time based. For example, an entity associated with a business might consistently show activity between a period of 8:00 AM and 5:00 PM. Thus, if the entity shows uncommon activity outside of that time period the reputation of the entity might be classified differently during business hours than it is overnight. Similarly, an entity might show consistent origination of traffic from a given geolocation (e.g., based upon a registered location or a first router that receives communications from the entity). Communications received from a different geolocation that claim to be associated with the same entity can be treated as suspect. In other implementations, the fact that an entity is being used for non-reputable activities can lead to the determination that the entity is not being properly secured and/or policed by an owner.

According to an embodiment of the present invention, in step 408, the data flow analyzer process 314 may be configured to determine whether the network elements/entities identified in step 406 are associated with one or more pre-existing managed object instances of the identified network elements. At least in some embodiments the identified network elements may be associated with incomplete (unfinished) managed object instances. For example, if one or more pre-existing managed objects comprise self-configured objects, one basic problem is that self-configuration is generally capable of preparing only a portion of the data needed for a managed object instance of the standardized object model representing a particular network entity. So long as the configuration data are not complete the managed object cannot be fully or at least partially used/managed by various users/processes.

In response to determining that the identified network entities are associated with the pre-existing managed object (decision block 408, "yes" branch), in step 410, the managed object configuration process 316 may analyze configuration of the one or more pre-configured managed objects. For example, the managed object configuration process 316 may reconfigure existing managed objects, or suggest new ones, to focus on parts of the network that may be vulnerable to new attack vectors. It should be noted that many network elements may be vulnerable to new attack vectors, exploiting zero day vulnerabilities on applications and operating systems, and coupled with the new modes of infection such as phishing. In particular, network entities (and associated managed objects) may be vulnerable to advanced persistent threats. These tend to be highly customized and coordinated, targeted and sustained attacks and are particularly hard to defend against because they utilize a wide variety of attack vectors. If such vulnerabilities are detected, the managed object configuration process 316 may suggest one or more configuration changes. For instance, if a set of attacks has been ongoing only from a specific country, the managed object configuration process 316 may split pre-existing managed objects to have a new one that covers just the country associated with the attack.

According to an embodiment of the present invention, in step 412, the managed object configuration process 316 may present interactive visual information conveying the effect of either proposed or automatically performed configuration changes to a user, via the aforementioned user interface, for example. As noted above, the user interface may comprise substantially any input/output device known in the art, such as a keyboard, a mouse, a touch pad, a display screen, etc. In one example, a graphical display of the proposed/performed configuration changes may be output to a display screen at the user interface in step 412.

Based on the foregoing it should be apparent that the exemplary embodiments of this invention provide a method capable of providing a managed object instance of a standardized object model representing a new node of a system, where the new node may be, as a non-limiting example, a new switch or a new router of a communication network and capable of providing a managed object instance based on performed analysis. According to an embodiment of the present invention, in response to determining that at least some network entities identified in step 406 are not associated with a pre-existing managed object (decision block 408, "No" branch), in step 414, the managed object configuration process 316 may generate a new managed object.

As one non-limiting example, the managed object configuration process 316 may leverage obtained DNS information to "follow" changes in IP addresses and may generate a new managed object covering a corresponding range of IP addresses. Another example of managed object generation capability may include determining, by the managed object configuration process 316, one or more common paths through the network and recommending, by the managed object configuration process 316, managed objects based on that information. As yet another non-limiting example, the managed object configuration process 316 may identify one or more network elements comprising common targets of network attacks and recommend/generate managed objects covering those targets (network elements).

At least in some embodiments, the managed object configuration process 316 may be configured to analyze a previously detected network attack and perform analysis of vulnerabilities of network elements in a specific network configuration based on information stored in the storage repository 320. Based on such analysis, the managed object configuration process 316 may recommend/generate one or more managed objects that would better encapsulate attack information during future attacks. In various embodiments, the managed object configuration process 316 may generate new managed objects automatically or may present the suggested objects to a user to obtain a manual approval.

In summary, various embodiments of the present invention disclose a novel approach to configure network monitoring and attack detection systems capable of analyzing a large amount of historical flow data which allows this hindsight to get an alternate view of historical attacks and to optimize generation/configuration of managed objects. The disclosed approach provides a number of advantages. One benefit of the above-described approach is that the aforementioned system is capable of providing diagnostic and configuration information related to managed objects that can replace labor intensive, slow and error prone manual configuration approach. Various software solutions contemplated by various embodiments of the present invention allow appropriately-detailed network description relevant to the monitored system. This near-real-time system specific information can be used by users to learn about the optimal managed objects settings for the detection system using network flow data that is more familiar to them.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network monitoring device for configuring managed objects in a monitored network having a plurality of objects comprising:
   a storage repository for storing network traffic flow information;
   one or more network interfaces communicatively coupled to the monitored network having a plurality of network nodal devices;
   providing a Graphical User Interface (GUI) responsive to a user interfacing for interactive analysis of flow record; and
   a processor coupled to each of the storage repository, one or more network interfaces and GUI, wherein the processor upon execution of instructions is configured to:
      receive from the storage repository a plurality of flow records from the plurality of network nodal devices;
      analyze the plurality of flow records according to user-specified criteria to identify one or more network traffic patterns relating to network security violations;
      identify a plurality of network entities associated with the one or more identified network traffic patterns;
      determine a single managed data object comprising the identified plurality of network entities;
      determine if there is a pre-existing single managed data object associated with the identified plurality of network entities;
      generate a single managed data object comprising the identified plurality of network entities if it is determined there is not a pre-existing managed data object associated with the identified plurality of network entities;
      suggest configuration changes for the single managed data object having the identified plurality of network entities associated with the one or more identified network traffic patterns; and
      re-configure the single managed data object with the suggested configuration changes without user intervention to mitigate network security violations, whereby the single managed data object is split into at least two separate managed data objects, wherein each separate managed data object relates to a respective network attack vector.

2. The network monitoring device as recited in claim 1, wherein relationships between the plurality of network entities and the one or more identified network traffic patterns are derived based upon any of communications between the entities.

3. The network monitoring device as recited in claim 1, wherein the user-specified criteria are associated with one or more network attacks and wherein the identified plurality of network entities comprises network entities targeted by the one or more network attacks.

4. The network monitoring device as recited in claim 1, wherein the processor is further configured and operable to analyze the plurality of flow records and is further configured and operable to, for each one of the plurality of flow records, estimate a path that network traffic that belongs to that flow at least likely flows through and wherein the identified plurality of network entities includes one or more network entities along the estimated path.

5. The network monitoring device as recited in claim 1, wherein the processor is further configured and operable to analyze the plurality of flow records is further configured and operable to, for each one of the plurality of flow records, determine a portion of network traffic that belongs to that flow.

6. The network monitoring device as recited in claim 1, wherein the processor is further configured to depict the suggested configuration changes on the GUI to present information conveying effects of the suggested configuration changes of the single managed data object devices to a user.

* * * * *